(12) United States Patent
Paduroiu

(10) Patent No.: US 11,436,219 B2
(45) Date of Patent: Sep. 6, 2022

(54) ORDERING EVENTS WITHIN A STREAMING DATA STORAGE PLATFORM

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 85 days.

(21) Appl. No.: 17/109,523

(22) Filed: Dec. 2, 2020

(65) Prior Publication Data

US 2022/0171764 A1 Jun. 2, 2022

(51) Int. Cl.
*G06F 16/00* (2019.01)
*G06F 16/23* (2019.01)
*G06F 16/22* (2019.01)
*G06F 16/2455* (2019.01)

(52) U.S. Cl.
CPC ...... *G06F 16/2379* (2019.01); *G06F 16/2246* (2019.01); *G06F 16/24568* (2019.01)

(58) Field of Classification Search
None
See application file for complete search history.

(56) References Cited

U.S. PATENT DOCUMENTS 10,565,208 B2 * 2/2020 Triou, Jr. .......... G06F 16/24568
2018/0332365 A1 * 11/2018 Kaitchuck ............... H04L 65/60
2021/0342354 A1 * 11/2021 Danilov ................ G06F 16/282

* cited by examiner

*Primary Examiner* — Anhtai V Tran
(74) *Attorney, Agent, or Firm* — Amin, Turocy & Watson, LLP

(57) ABSTRACT

The described technology is generally directed towards a streaming data storage system that maintains streamed events, including in a manner that facilitates the ordering of those events based on external ordering (position) data. An event is appended to an event segment, and an index segment maintains offset information to the event relative to the offsets of other previously appended events. The index segment is ordered by position data provided with the event, such that the events (e.g., for a given event routing key) can be read back in position order instead of append order. An ongoing read that returns an event (that matches ongoing read criteria) as the event arrives can also be handled. Also described is the use of a tail index and an indexing queue for more efficient handling of events prior to writing the offset information into the index segment.

20 Claims, 15 Drawing Sheets

US 11,436,219 B2

ORDERING EVENTS WITHIN A STREAMING DATA STORAGE PLATFORM

TECHNICAL FIELD

The subject application relates generally to data storage, and, for example, to a technology that orders events in storage systems that implement data streams for storing and serving continuous and unbounded data, and related embodiments.

BACKGROUND

Some contemporary data storage systems, such as DELL EMC's PRAVEGA system/data storage service, store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

One stream may be divided into one or more segments, with each new event appended by a writer application to a segment that is determined based on a hash computation of a routing key associated with that event. Once written, the events in a stream/stream segment are immutable and cannot be modified. At the same time, PRAVEGA guarantees ordering within a stream, in which the order that stream data is consumed by readers is generally the same as the order in which the events were ingested into the system and thus written to a stream segment. In some scenarios, however, this may not be the order in which a user of the system wants the data to be consumed by a reader application.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards an ordered segment that facilitates an ordered view of streaming data events within a stream segment, in which the order the events are consumed by an ordered segment-capable reader application depends on user-specified position data associated with the events. In general, the events that an ordered segment-capable writer application writes comprise an additional component, namely a position value, (or more simply a "position"). Thus, in addition to the existing routing key and event contents (the payload), an ordered event includes a position. More particularly, the position is a value (e.g., number) that the application provides with each event, and which is used to define the order of that event relative to other events within the enclosing ordered stream. In this way, regardless of the actual order in which events are appended to a segment, when reading events supplied with positions, the data storage system is able to serve events in a natural order of positions (within a given routing key).

It should be understood that any of the examples herein are non-limiting. For instance, some of the examples are based on PRAVEGA data storage technology; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
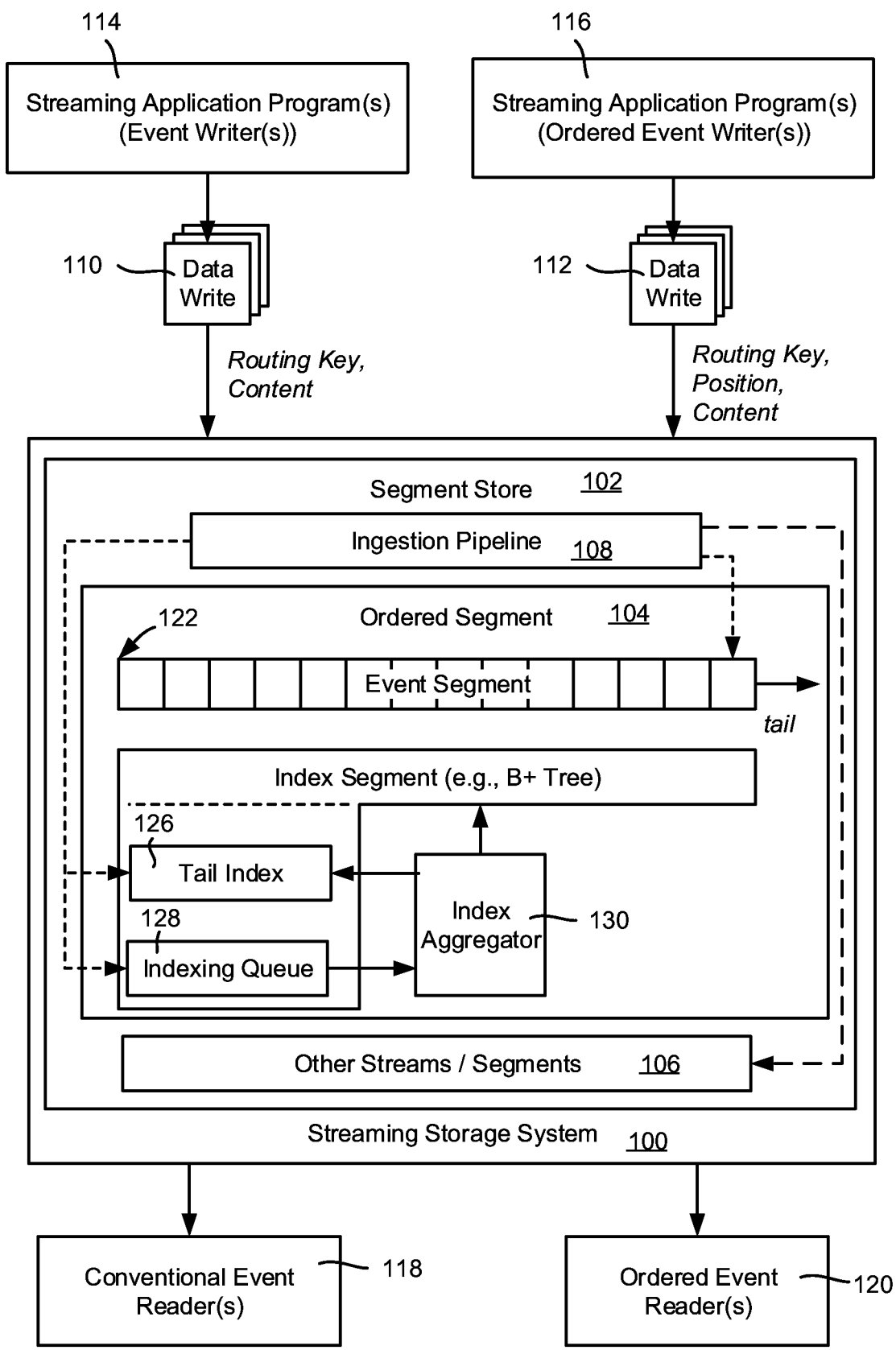
FIG. 1 is a block diagram representation of example components and data-related operations in a streaming data storage system in which events can be viewed in order via ordered segments, in accordance with various aspects and implementations of the subject disclosure

FIG. 1 shows a streaming data storage system 100 that includes a segment store 102 that maintains segments of streamed data events, including an ordered segment 104 as described herein, and which may include one or more other streams/segments 106. In general, an ingestion pipeline 108 appends data writes 110 and 112 received from streaming application programs 114 and 116, respectively. The application programs 114 and 116 that provide the events are referred to as event writers, including an ordered event writer (the application program 116) that provides the events that include position data for the ordered segment 104. As is known, a conventional event such as corresponding to one of the data writes 110 comprises a routing key along with the event data contents to be stored; the contents are alternatively referred to herein as the payload. The ingestion order into the pipeline 108 generally determines the order of appending the conventional data write events 110; a conventional event reader (application program) 118 consumes the events in the ingestion order for processing.

As described herein, for an ordered event, each of the data writes 112 contains the routing key, the relative position and contents (the payload). As set forth herein, the position is a value (e.g., a number, which can be a timestamp or the like) that the writer application 116 provides with each event. The position can be anything (e.g., that fits into a field or the like) that a user specifies for the application, based whatever criteria the user desires. While the ingestion order determines the order of appending the data write events, via the position data the writer application defines the order of an event (relative to other ordered events) within the enclosing event store, which in this example is an ordered stream/segment 104. When ordered events are read by an ordered segment-capable event reader (or readers) 120, the events are read in position order.

By way of an example, consider the following events (denoted as Event:Position for simplification), ingested (appended) in the following order E1:10, E2:15, E3:5, E4:11. The ordered event reader 120 reads the events in their position order of E3, E1, E4, E2 (based on their positions of 5, 10, 11, 15).

Continuing with example above, if the system further appends E5:11 and E6:20, then a full re-read of the segment yields E3, E1, E4, E2, E5, E6 (based on their relative positions of (5, 10, 11, 11, 15, 20). Note that in this example, because both E2 and E5 had position values of 11, the order of appending provided the tiebreaking mechanism, although it is feasible to have E5 read before E2 with a different tiebreaking mechanism (or with none). Further note that if an ordered reader application program has already read E3, E1, E4, E2, a continuation of the previous read yields E5, E6 (after E3, E1, E4, E2). This is a departure from the read consistency guarantee for classic stream segments, which says that once events were read in an order, they will always be read in that order. As such, ordered segments are based on a new primitive as described herein.

In one or more implementations, an ordered segment such as the ordered segment 104 of FIG. 1 comprises sub-segments, including an event segment (ES) 122 and an index segment (IS) 124. Both the event segment 122 and index segment 124 can be regular PRAVEGA segments (although alternative implementations can have different data structures). The event segment 122 holds the events appended to the ordered segment 104, while the index segment 124 can be used to rearrange those events from the append-based ordering to the position-based ordering.

More particularly, consider that the event segment 122 is a classic (e.g., PRAVEGA) data storage segment, that is, the ordered view is able to be provided on top of a classic data storage segment that stores data via append-based ordering. Such an event segment 122 is immutable once written, and there is no manipulation of events within the event segment. As described herein, via the index segment 124, the technology provides an ordered view into the event segment.

It should be noted that in one or more implementations, the index segment 124 can receive frequent updates, and as such, for practical reasons other data structures and components are provided to facilitate batch updates to the index segment 124 while still providing full order-based reads of the event segment 122. As shown in FIG. 1 and as described herein, in one or more implementations, the additional data structures include a tail index 126 (which also includes or is coupled to logic as described with reference to FIG. 5) and an indexing queue 128; an index aggregator component 130 performs the batch updates to the index segment 124, and accesses/maintains the data structures.

Figure 2:
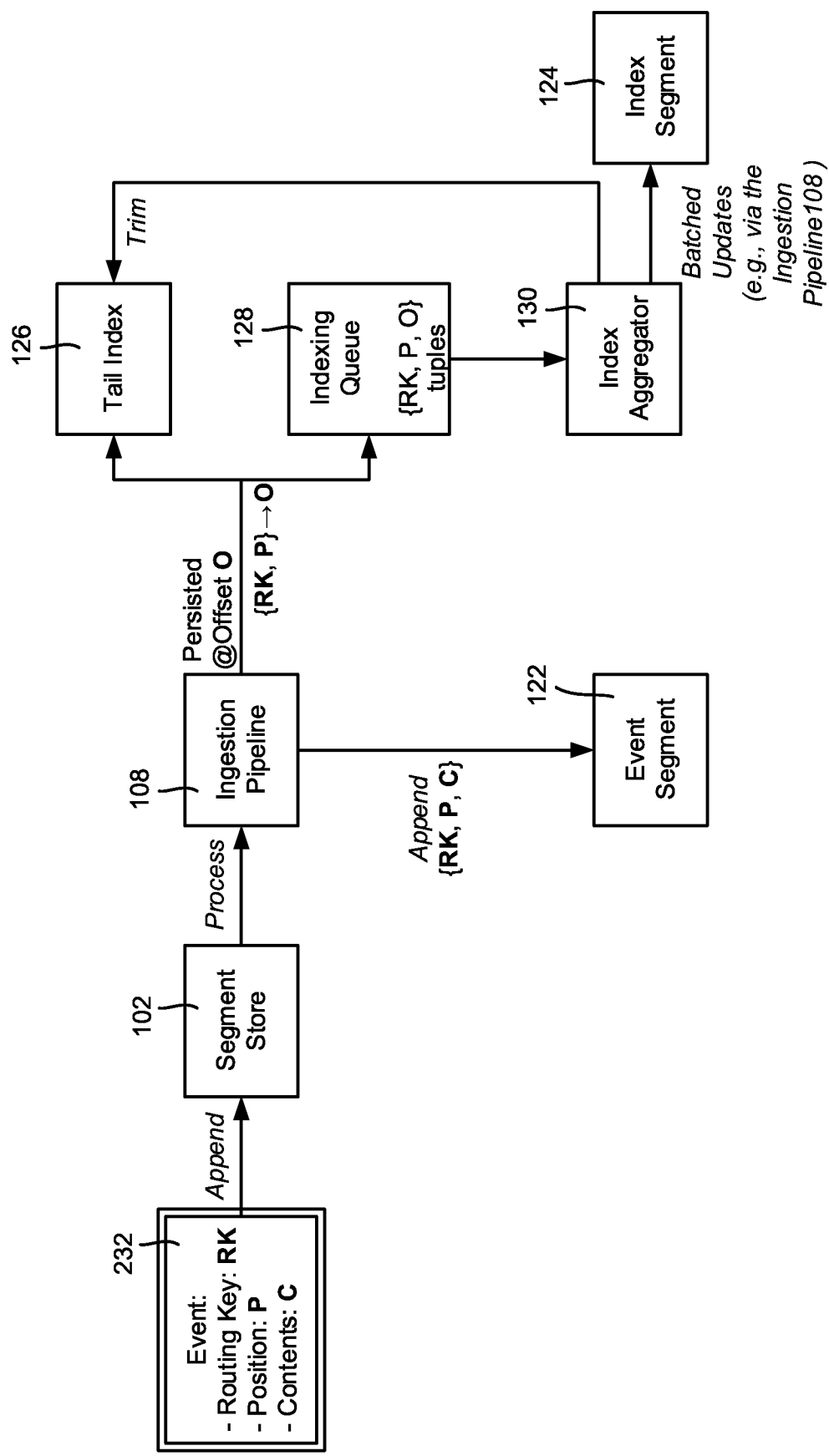
FIG. 2 is a block diagram showing example components and data structures that can be used to append ordered events to an ordered segment comprising an event segment and index segment, in accordance with various aspects and implementations of the subject disclosure.

FIG. 2 shows an example of an ordered event being appended to an event segment (e.g., the event segment 122 of FIG. 1) and processed by the ordered segment-related components (e.g., as described with reference to FIG. 1). In general, appending an event 232 involves writing the event 232 to the event segment 122 and (assuming the write is successful in this example), maintaining the event's position data in the index segment 124. In one aspect, this can be done using the components and operations of FIG. 2.

For example, when an ordered event 232 with routing key RK, position P and contents C is to be appended to an ordered segment, (e.g., the ordered segment 104 of FIG. 1), the ordered event 232 is received by the segment store 102. More particularly, in one implementation, the ordered event 232 is queued up and picked up by the segment store's ingestion pipeline 108, by which the ordered event 232 is serialized (into an entry including RK, P and C) and appended to the event segment 122 at an append (tail) location corresponding to an offset O.

The tuple {RK, P, O} is, in parallel or substantially in parallel, sent over to the index segment's tail index 126 and the index segment's indexing queue 128. Note that the contents C (payload) are not sent to the tail index 126 and the indexing queue 128, as the payload is persisted in the event segment 122. Further, in FIG. 2, an index entry {RK, P}→O means that at offset O within the event segment 122, there is an event entry with routing key RK and position P (content C, that is, the event's payload, is also present as part of the entry in the event segment 122). Further note that the indexing queue 128 is a similar data structure to the index segment 124, configured for fast storage and for efficient access when writing batch updates as described herein.

When these operations are performed, the append is considered successful and can be acknowledged (ACK-ed) to the user/writer application. The event 232 is now also available for reading as described herein.

It should be noted that the serialized entry (comprising RK, P and C) appended to the event segment 122 includes the position data P, although alternative implementations need not store the position data because the entry's offset will be tracked by position and the offset is maintained as described herein. Notwithstanding, maintaining the position data P with the routing key and content allows the index segment to be recreated (in whole or part) should any part of the index segment's data become lost, corrupted or otherwise unavailable.

Figure 3:
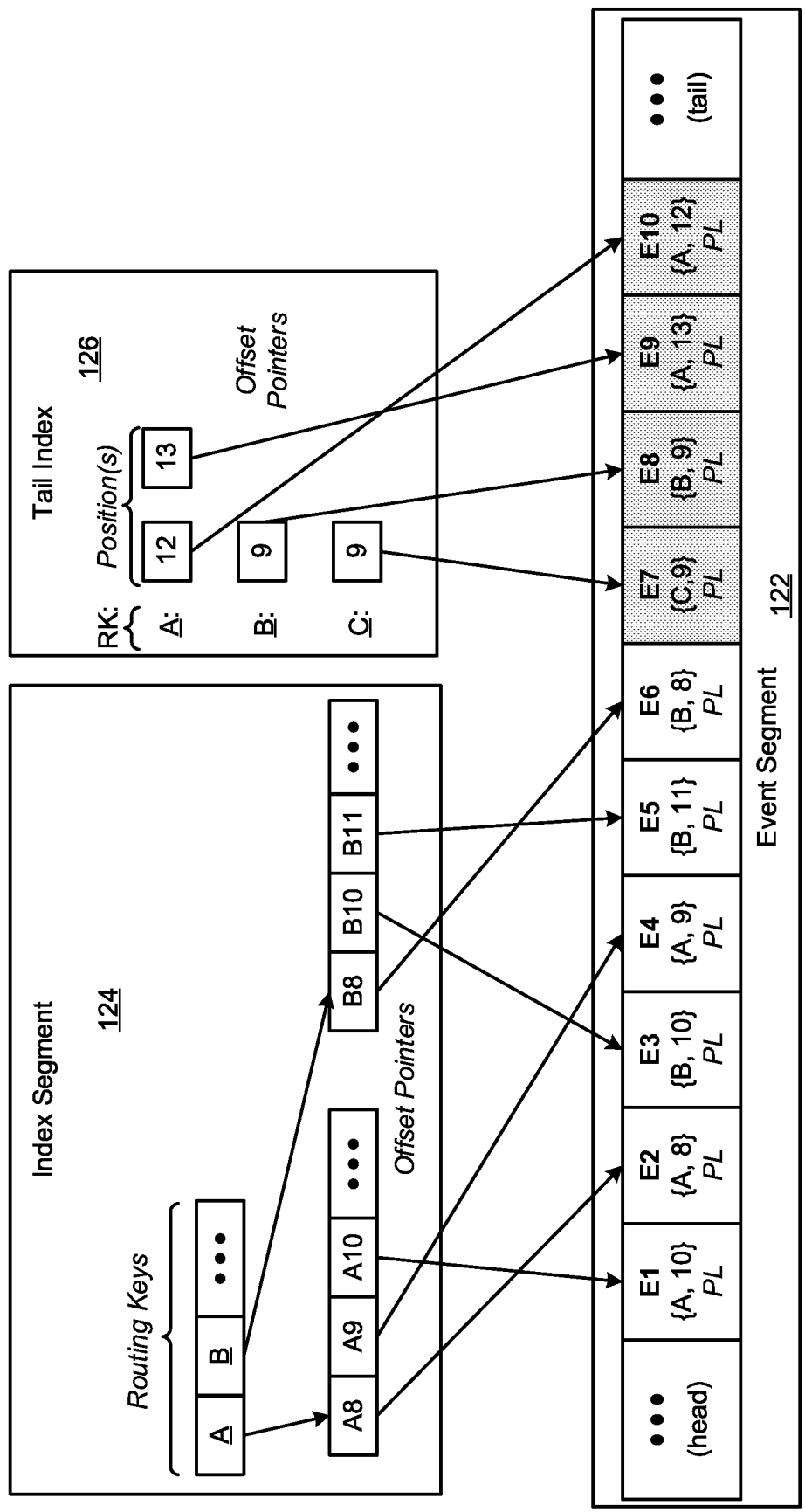
FIG. 3 is an example representation of an event segment, index segment and tail index, in accordance with various aspects and implementations of the subject disclosure.

As represented in the example of FIG. 3, the index segment 124 is an index that sorts offsets (into the event segment 122) by routing key and position values. With respect to the index segment 124, index keys are the concatenation of routing keys and positions, while the keyed index values are the offsets within the event segment 122. Because the index keys are concatenated in this order (and the index is sorted), the index segment 124 is naturally sorted by routing key, and then by position within each routing key, (routing key, position grouping) as shown in the index segment 124 of FIG. 3.

Due to the concatenation of routing keys and positions, this allows effectively interleaving multiple indices efficiently into a single, bigger index (e.g., to better optimize for ordering within a routing key). This solution provides benefits over approaches having one such index per routing key, as there can be numerous (e.g., on the order of millions) of routing keys assigned to a single segment; interleaving indices as described herein helps reduce overhead relative to other approaches.

As set forth herein, there are multiple ways to implement indices for an index segment, although one embodiment of an index segment described herein uses a B+ tree implementation that is configured for append-only backing media. However, because the index segment 124 is subject to frequent updates, in this implementation the writing of updates to the index segment 124 can be delayed for efficiency, that is, updates are batched when there are sufficient updates to perform the index segment writing.

To efficiently access the indexing data until batch updated to the index segment 124, a tail index data structure 126 is maintained (e.g., in fast access memory/storage) to hold changes to the index segment 124 that have not yet been persisted to the index segment 124. The tail index 126 is modified whenever the system appends a new event, and the tail index 126 is trimmed every time one or more index changes are persisted to the index segment 124. As described herein, the tail index 126 is queried when a read operation is performed.

As shown in FIG. 3, the tail index 126 holds a sorted map, where each entry maps a routing key and position to an offset value within the event segment 122. From a logical point of view, the tail index 126 is a similar data structure to the structure of the index segment 124, while being configured (sorted) for reading by routing keys.

Thus, in the example of FIG. 3, the index segment 124 contains position-based offset pointers to the event segment 122 (entries E1 to E6, containing, {routing key, position} and where PL represents payload/content), with the pointers sorted by their routing keys (A, then B and so on) and within each routing key by position (A8, A9, A10 . . . B8, B10, B11 . . . ) and so on by routing key, position groupings. The tail index 126 shows respective offset pointers to event entries E7-E10 (shown shaded) based on respective sorted routing keys A, B and C and their associated positions.

Returning to FIG. 2, as set forth herein, the index aggregator 130 monitors the indexing queue 128 and makes determinations as to when to persist changes (e.g., batch updates) to the index segment 124. The index aggregator 130 can operate asynchronously, in the background. Triggers for persisting the changes may be time based (elapsed time since last persist) or size-based (number and/or size of updates accumulated).

When persisting, the index aggregator 130 picks up one or more updates (an update set U) from the head of the indexing queue 128. The updates in U are mapped to contiguous ranges in the event segment 122. In one implementation, the index segment 124 is a B+ Tree, and results in an append to the segment that backs the index segment 124 by going go back through the ingestion pipeline 108 to persist the offset entry into the index segment 124. Alternative index segment implementations may choose not to use a PRAVEGA segment, whereby using the ingestion pipeline 108 may not be appropriate for such alternative index segment data structures.

Further, in the example of FIG. 2, the index aggregator 130 trims the tail index 126 of any data that was persisted to the index segment 124. For example, consider that when selecting the update set U, the highest offset value is known to the index aggregator 130; the tail index 126 is thus trimmed based on this highest offset value. Note that the indexing queue 128 that provided the set U, from which the highest offset value is determined, can be a first-in, first-out queue (corresponding to the event entry appending order) that need not be trimmed.

Turning to reading events, reading events can be done in multiple ways, including in the order in which they were appended. That is, in an implementation in which the event segment is a classic PRAVEGA segment, events are read and processed beginning at an offset in the event segment, which can be the event segment beginning or at some cut point, until some stopping point, which can be the end of the segment). Thus, existing reader applications and the APIs that allow access to a stream still continue to work with an event segment, including for reading the current set of events in the segment and also by "tailing" the segment (reading events as soon as they are appended to the segment).

Figure 4:
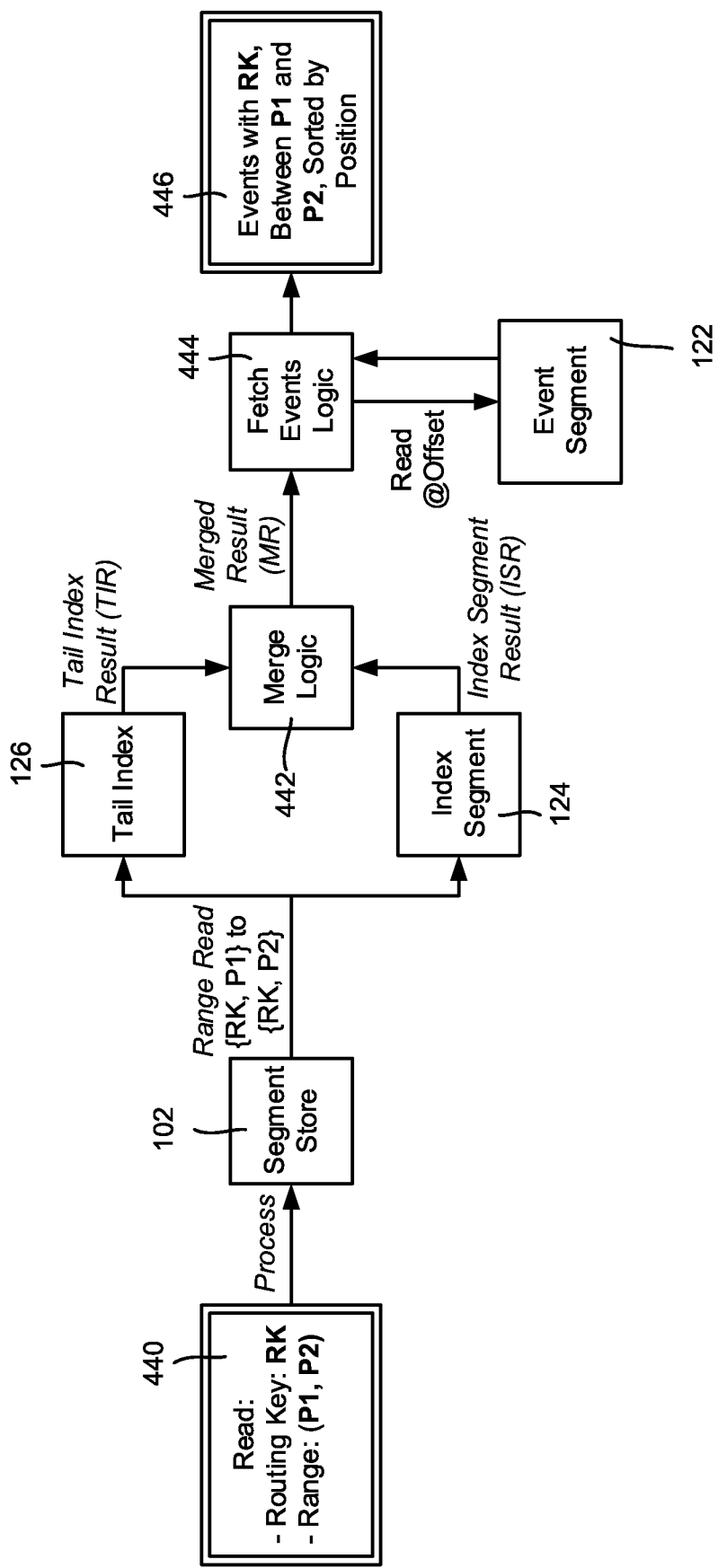
FIG. 4 is a block diagram representation of components and data structures for reading events according to an externally defined position order, in accordance with various aspects and implementations of the subject disclosure.

As described herein, ordered events (those written with a position) can be read in the order specified by the writing application, that is, by position order. To this end, as shown in FIG. 4, a read request 440 is received, e.g., at the segment store 102 via a client component/reader application API call or the like. In one implementation, the read request specifies a routing key RK and a position range (P1, P2), which is basically interpreted by the data storage system as "read and return the events for routing key RK with positions between P1 and P2" or the like. Note that P1 and/or P2 are optional; if P1 is absent (e.g., NULL or the like), the system reads events with the specified routing key RK from the beginning of the segment; if P2 is absent, the system reads events with the routing key RK until the end of the segment.

Once the request is received, a range read is made, in parallel or substantially in parallel, to the index segment 124 and to the tail index 126 for the range ({RK, P1}, {RK, P2}). In FIG. 4, the read result from the index segment (ISR) is merged by merge logic 442 with the read result from the tail index 126 (TIR) into a merged result (MR). Note that both ISR and TIR return the read entries in sorted order.

A range read comprises an iterator that loops through the returned entries in a collection between two values. This corresponds to sorted collections, where there is an order between the elements, and as both the index segment 124 and the tail index 126 are sorted collections (by key), such requests can be served efficiently.

Thus, with the sorted ISR and TIR, the merge logic 442 merges ISR and TIR into the merged read result MR, which is straightforward to do in a manner that results in MR being sorted as well. Once the merged read result MR is obtained, fetch events logic 444 processes the merged read result MR in order and transforms MR into the final read result, e.g., using the following transformation:

For each offset $O_i \in$ MR.Offsets (the MR values are offsets within the event segment 122), read event entry $E_i$ from the event segment 122 at offset $O_i$. This can be to a data structure such as a list 446. When the read is finished (or partially finished as further reads are occurring), the fetch event logic 444 returns the Events $E_i$ (as obtained) in order to the caller. Note that it is feasible to filter out the routing key and/or position, and return the event contents/payloads, such as in order beneath a routing key heading or the like. It is also feasible to convert the position value to a different representation, such as from a timestamp to something more readable/understandable to a human.

Another type of read is an ongoing read, that is, one that listens for events between two explicit positions and notifies the consumer about new such events as they arrive. This is like a tail read for classic segments, but there is no "tail" in this case.

Figure 5:
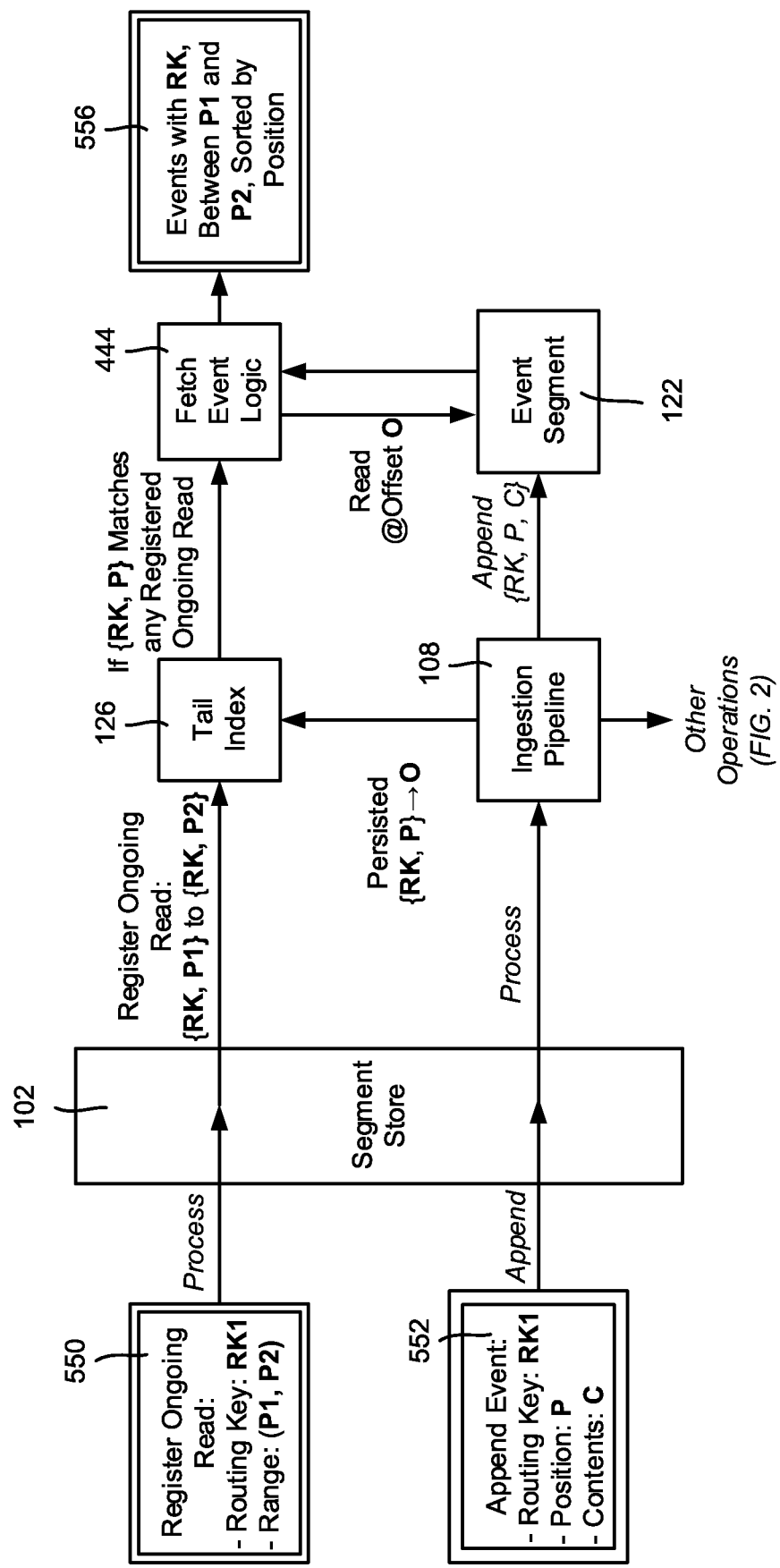
FIG. 5 is a block diagram representation of components and data structures for performing an ongoing reading of events between two positions in an externally defined position order, in accordance with various aspects and implementations of the subject disclosure.

FIG. 5 illustrates an example of an ongoing reading of events in the order specified by the writing application (by position order). In this example, when an ongoing read request is received by the segment store for some routing key RK1 and position range (P1, P2), the segment store 102 registers this request in the tail index 126 to associate {RK1, P1, P2} with the reader/connection/channel that requested the ongoing read.

An event append operation was described herein with reference to FIG. 2, and can be extended as in FIG. 5. For example, when an event {RK1, P, C} is appended, after being written to the event segment 122, the event is registered in the tail index 126 as ({RK1, P}→Offset O}. Logic incorporated into or coupled to the tail index 126 compares {RK1, P} against any registered ongoing reads.

For any registered ongoing reads that match, (e.g., routing key RK1 and a position range that includes P), the event entry is fetched (block 444) from the event segment 122 at the offset O to a return data structure 556 or the like, which is sent over to the reader(s) that originally registered the ongoing read(s). This may include doing fetching an event once for any registered reads that match the event routing key and position.

Note that instead of storing event contents only in the event segment 122 and the routing key, position keyed offset in the tail index 126, it may be more optimal to also send an event (e.g., including its contents) that matches an ongoing read request or requests more directly to the registered reader or readers. Such an operation precludes the need to re-fetch the event contents from the event segment. For example, the tail index 126 or other logic (e.g., coupled to the append output of the ingestion pipeline 108) can determine that there is a match with ongoing read request(s) based on an event's routing key and position, and in parallel or substantially in parallel with the appending operation, send a copy of the whole event to the registered reader or readers.

Unlike "persisted reads" from the event store (and possibly the tail index), ongoing reads cannot guarantee that the events served to the reader follow the natural order according to the user-specified position). Newly arriving events are served in whatever order in which they are appended, as long as they match the requested routing key and position range filter. While this helps a reader application to be immediately notified of recently added events that matching specified position criteria, it is the responsibility of the application to handle events out of order in the case of an ongoing read.

Notwithstanding, ongoing reads also can be a hybrid between reading events that are already persisted as event segment entries and newly arriving events (e.g., to read already persisted events and then seamlessly listen for newly arriving events). For example, a read request can be registered as an ongoing read, with already persisted data that matches the read request fetched and returned. Note that new events matching the criteria may arrive while reading the already persisted events, which can be problematic with respect to returning them in order. To resolve this situation, the system may buffer any results from an ongoing read that occur while serving the persisted event reads, and when the persisted event reads completes, serve the buffer results, and then switch over to a full "ongoing read mode" (without ordering guarantees) as described herein.

Alternatively, when buffering any results for ongoing read requests that occur while serving the persisted event reads, if any newly added event has a position smaller than the last one that has been read, that event can be served to the reader immediately. Further, the results from the persisted read and the buffered reads can be merged (and served in the "natural" position) and when this is complete, switch over to the full ongoing read mode (without ordering guarantees as described herein.

Figure 6:
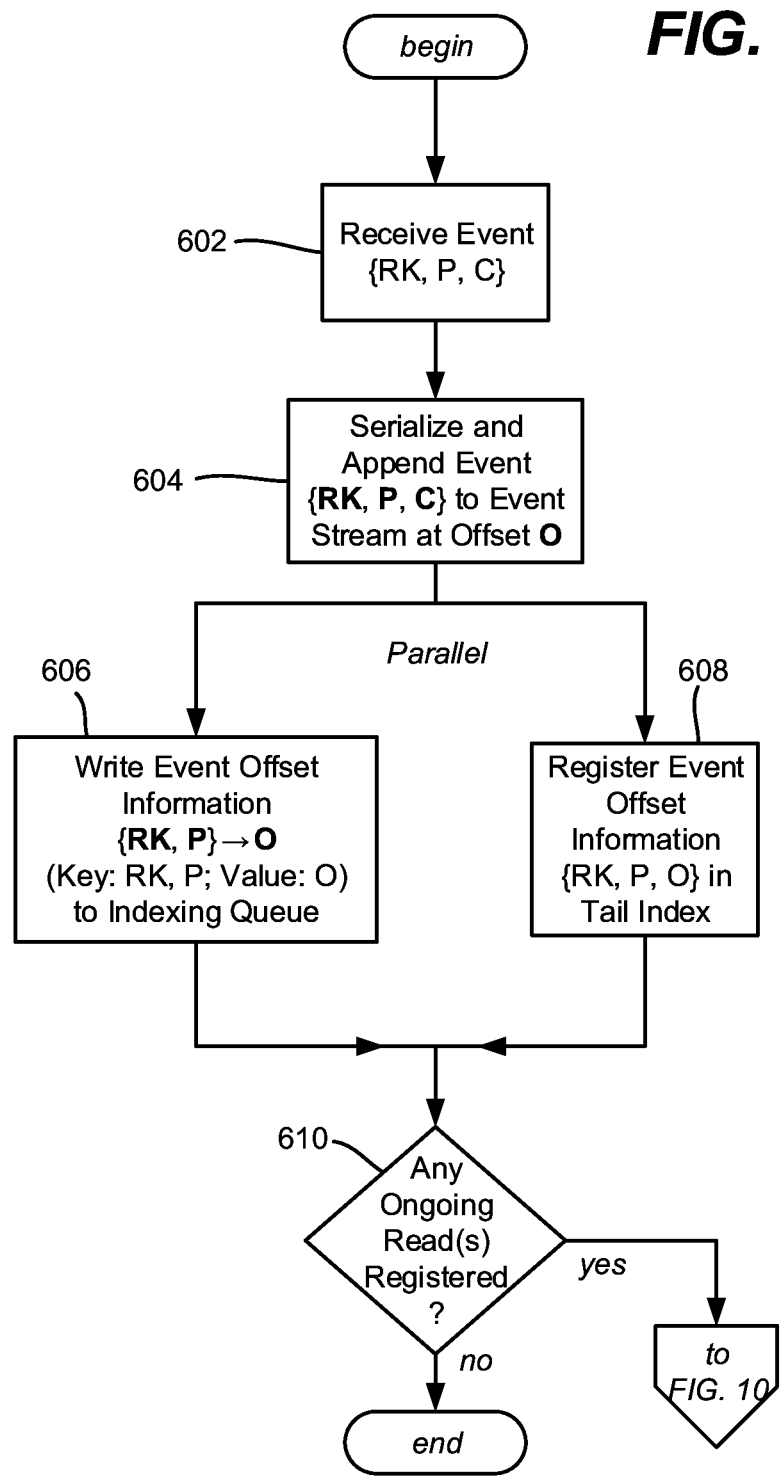
FIG. 6 is a flow diagram showing example operations of appending an ordered event to an event segment and updating indexing-related data structures for relative ordering of the event, in accordance with various aspects and implementations of the subject disclosure.

FIG. 6 is a flow diagram summarizing example operations that can take place when a new ordered event comprising routing key, position and content {RK, P, C} is received, beginning at operation 602. Operation 604 serializes the event and appends the serialized data to the event segment at a current offset location O as described herein. Assuming no error occurred, acknowledgment (not shown) to the writer can be done at this time, (or possibly only after example operations 606 and 608, described below, are also successful).

Operation 606 further writes the event indexing information (routing key, position and offset) to the indexing queue for subsequent batch writing to the index segment. Operation 608 registers the sorted (by routing key and position) offset pointer in the tail index, in case a read request for that event is made before the event is persisted to the index segment; that is, for a merged read as described herein. As described above, the indexing information for operations

606 and 608 can be sent to the indexing queue and tail index in parallel or substantially in parallel.

In the example of FIG. 6, operation 610 evaluates whether there are any ongoing read requests, and if not, the process ends for this event. Otherwise the process branches to the example operations of FIG. 10 to handle the event with respect to the ongoing read request, e.g., to look for a match based on the position and routing key.

Figure 7:
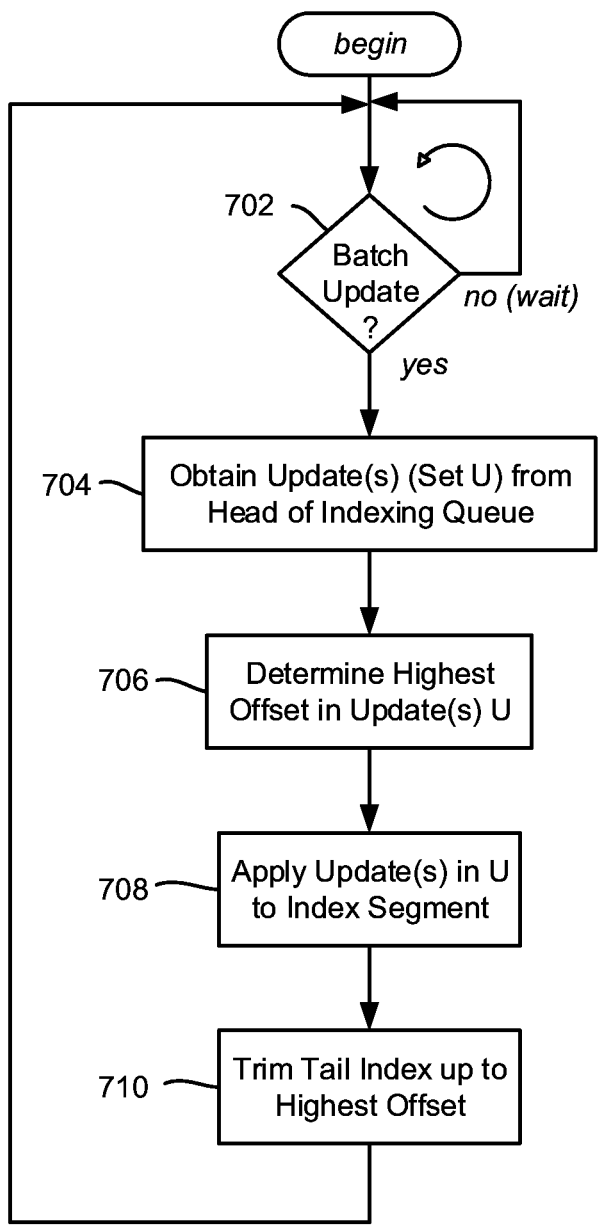
FIG. 7 is a flow diagram showing example operations for updating an index segment via batch updates and trimming an indexing-related data structure based on the updating, in accordance with various aspects and implementations of the subject disclosure.

FIG. 7 is a flow diagram of example operations showing a batch update by the index aggregator logic. Operation 702 represents waiting for the aggregator trigger (e.g., based on meeting threshold criterion such as time duration, number of events, size of events, and/or the like), although it is understood that this can be event driven rather than an actual loop as shown.

Operation 704 obtains the updates (the update set U) from the head of the indexing queue. Operation 706 determines the highest offset value within the update set U, which as described herein is used for trimming the tail index.

Operation 708 applies the update(s) in the set U to the index segment. If the index segment is a PRAVEGA segment or the like, the ingestion pipeline can be used to insert the index entry. Operation 710 represents trimming the tail index based on (e.g., up to) the routing key, position index with the highest offset value.

Figure 8:
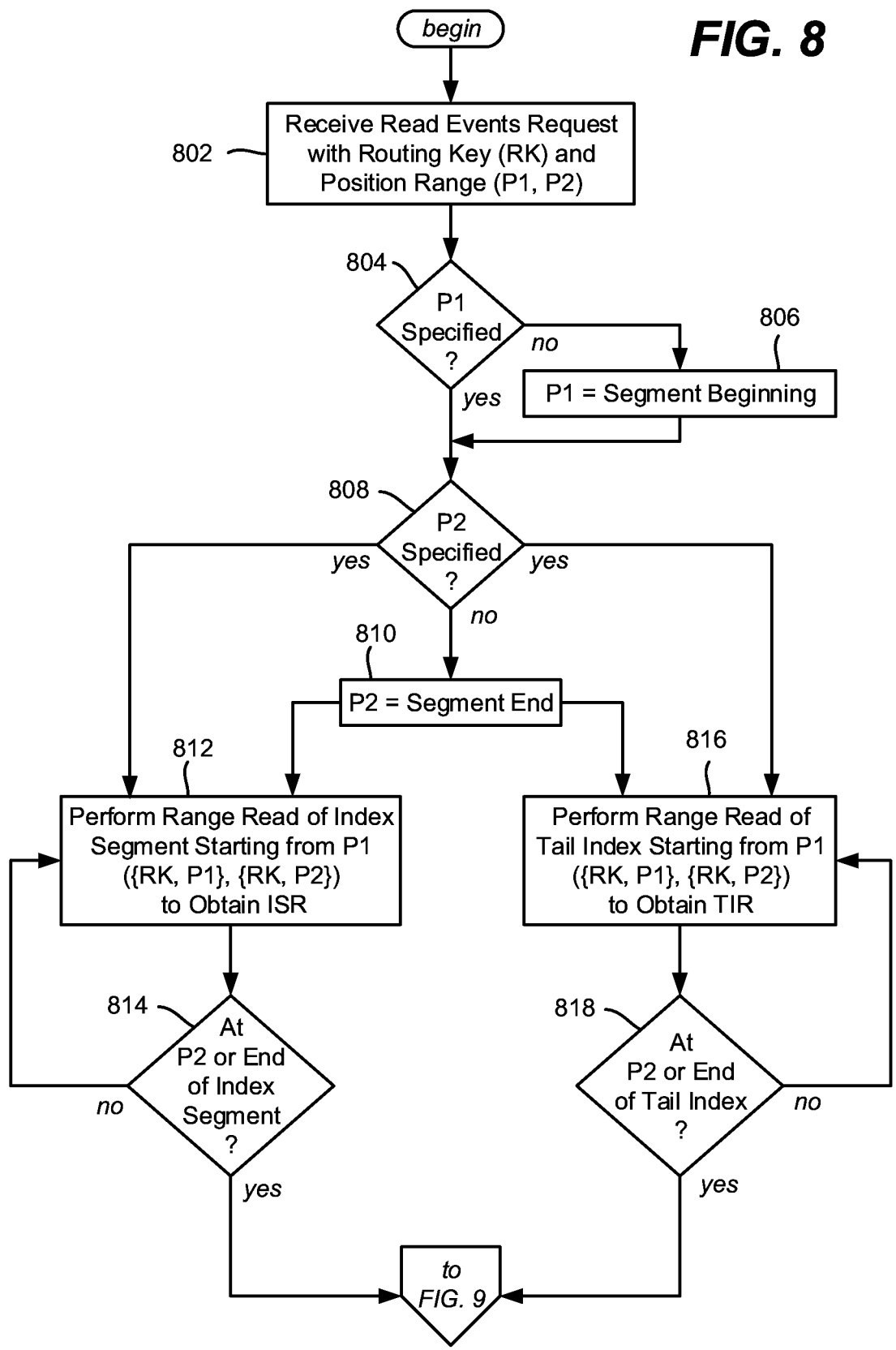
FIGS. 8 and 9 comprise a flow diagram showing example operations related to reading and returning events in position order, in accordance with various aspects and implementations of the subject disclosure.
Figure 9:
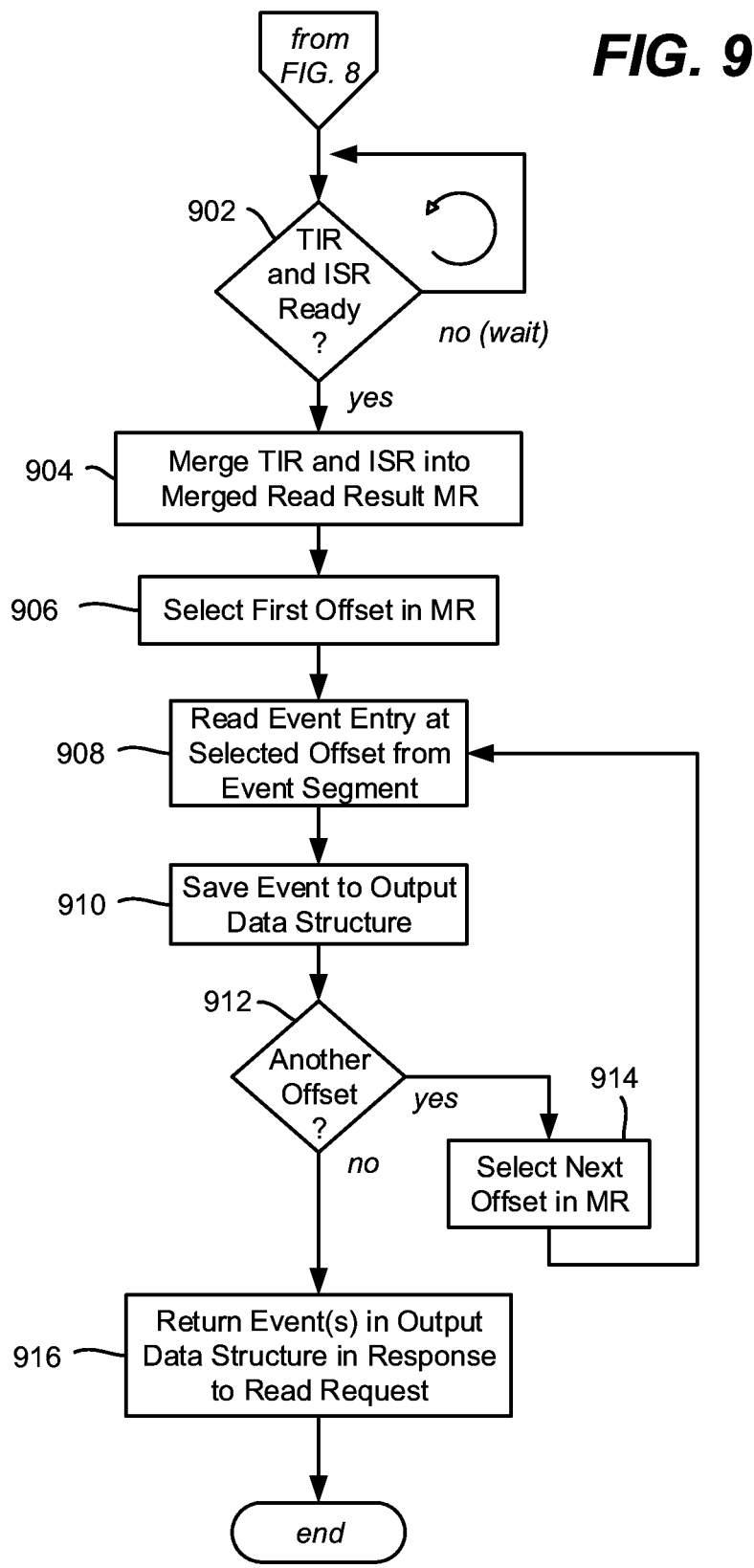

The example operations of FIGS. 8 and 9 represent handling a range-based read request, (not an ongoing read request), beginning at operation 802 of FIG. 8 where the request containing a routing key is received. Operations 804 and 806 default to the segment beginning if no starting position P1 is specified with the request; similarly operations 809 and 810 default to the segment end if no ending position P2 is specified.

Operations 812 and 814 represent the range reading iterator of the index segment for the specified routing key entries between the position ranges, to obtain the offsets into the event segment, in order. Operations 816 and 818, which can be in parallel or substantially in parallel with operations 812 and 814, represents the range reading of the tail index for the specified routing key entries between the position ranges, to obtain the offsets into the event segment, in order, for this read request. The process continues to FIG. 9, operation 902.

Operation 902 of FIG. 9 waits for both range reads to complete, that is, until the tail index read result (TIR) and index segment read result (ISR) are ready; (although it is feasible to perform some merging before both range reads complete). Operation 904 merges the TIR and ISR into the merged read result MR.

With the merged read result, operation 906 selects the first offset, and operation 908 reads the event entry at that offset location from the event segment. Operation 908 saves the read event data to an output data structure.

Operations 912 and 914 repeat the process for other offset values in the merged read result until none remain. Operation 916 returns the read event(s), e.g., at least their content that are in the output data structure to the requesting entity (an ordered reader application program) in response to the read request. Note that for a large position range corresponding to a large number of events, it is feasible to return partial results while still reading events in order from the event segment, and update those results (keeping the ordering) as more and more entries from the event segment are obtained.

Figure 10:
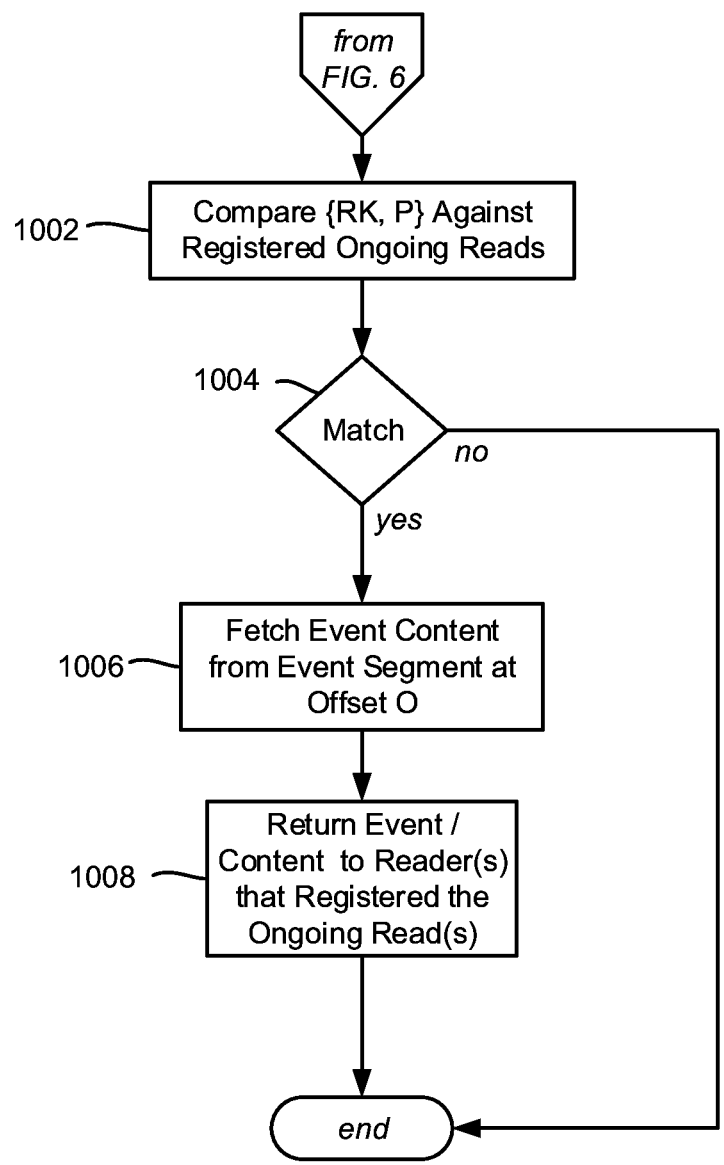
FIG. 10 is a flow diagram showing example operations for handling ongoing read requests with respect to a newly appended event, in accordance with various aspects and implementations of the subject disclosure.

FIG. 10 shows example logic for an ongoing read, beginning at operation 1002 where an event's routing key and position are compared against registered ongoing reads. If there is no match as evaluated at operation 1004, the process ends. If instead there is at least one match at operation 1004, the process uses the offset value for the event to fetch the event (e.g., including its content) from the event segment at operation 1006, and at operation 1008 returns the appropriate event data to the reader or readers that registered a matching ongoing read. Note that in the example of FIG. 10, operation 1004 can be repeated for each registered ongoing read request, or can evaluate multiple registered readers at once. Further note that if the event entry is cached (e.g., in fast local memory) until operation 1004 completes and finds any match(es), then instead of fetching the event from the event store at operation 1006, the cached copy can be returned at operation 1008, which may be more efficient than fetching the event from the event segment.

Figure 11:
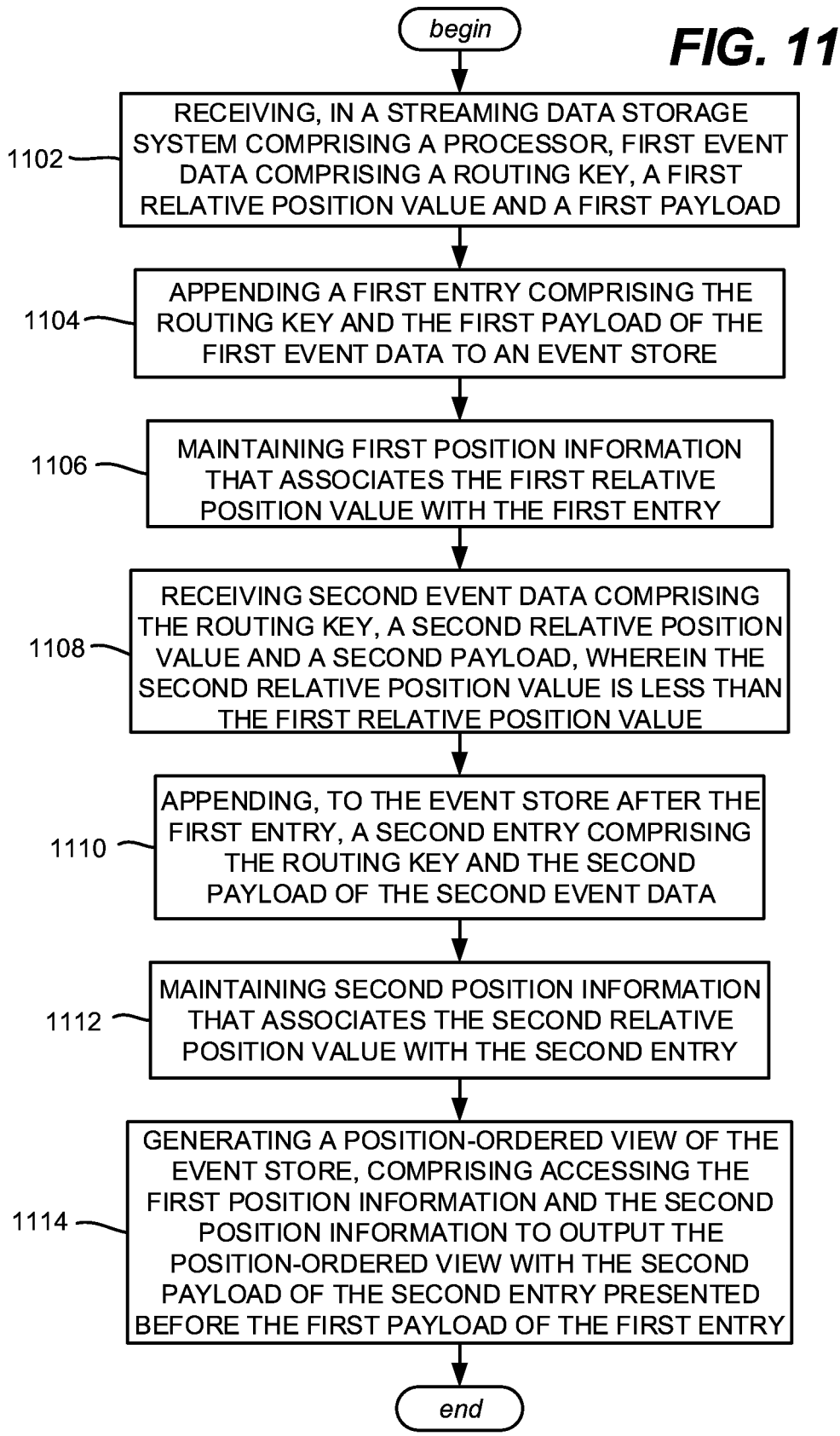
FIG. 11 is a flow diagram showing example operations related to generating a position order view of events, in accordance with various aspects and implementations of the subject disclosure.

One or more example aspects, such as corresponding to example operations of a method, are represented in FIG. 11. Operation 1102 represents receiving, in a streaming data storage system comprising a processor, first event data comprising a routing key, a first relative position value and a first payload. Operation 1104 represents appending a first entry comprising the routing key and the first payload of the first event data to an event store. Operation 1106 represents maintaining first position information that associates the first relative position value with the first entry. Operation 1108 represents receiving second event data comprising the routing key, a second relative position value and a second payload, wherein the second relative position value is less than the first relative position value. Operation 1110 represents appending, to the event store after the first entry, a second entry comprising the routing key and the second payload of the second event data. Operation 1112 represents maintaining second position information that associates the second relative position value with the second entry. Operation 1114 represents generating a position-ordered view of the event store, comprising accessing the first position information and the second position information to output the position-ordered view with the second payload of the second entry presented before the first payload of the first entry.

Generating the position-ordered view of the event store can comprise receiving a read request that specifies the routing key and a position range that comprises the first position value and the second position value.

Generating the position-ordered view of the event store can comprise receiving an ongoing read request that specifies the routing key and a position range that comprises the first position value and the second position value; further aspects can comprise receiving third event data comprising the routing key, a third relative position value and a third payload, appending, to the event store after the second entry, a third entry comprising the routing key and the third payload of the third event data, maintaining third position information that associates the third relative position value with the third entry, and updating the position-ordered view of the event store comprising outputting the third payload of the third entry in conjunction with the output of second payload of the second entry and the first payload of the first entry.

Appending the first entry can comprise including the first position data with the routing key and the first payload within the first entry, and the appending the second entry can comprise including the second position data with the routing key and the second payload within the second entry.

Maintaining the first position information can comprise maintaining an index data structure comprising a first offset location of the first entry in the event store, the first offset location indexed by the routing key and the first position value, and maintaining the second position information can comprise maintaining the index data structure comprising a second offset location of the second entry in the event store, the second offset location indexed by the routing key and the second position value.

Maintaining the first position information can comprise maintaining a persistent index data structure comprising a first offset location of the first entry in the event store, the first offset location indexed by the routing key and the first position value, and maintaining the second position information can comprise maintaining a tail index data structure comprising a second offset location of the second entry in the event store, the second offset location indexed by the routing key and the second position value. Generating the position-ordered view of the event store can comprise receiving a read request that specifies the routing key and a position range that comprises the first position value and the second position value, and merging a first read of the persistent index data structure and a second read of the tail index data structure. Aspects can comprise maintaining an indexing queue corresponding to the tail index, updating the persistent index data structure with data in the indexing queue, and trimming the tail index of data corresponding to the data persisted from the indexing queue.

Figure 12:
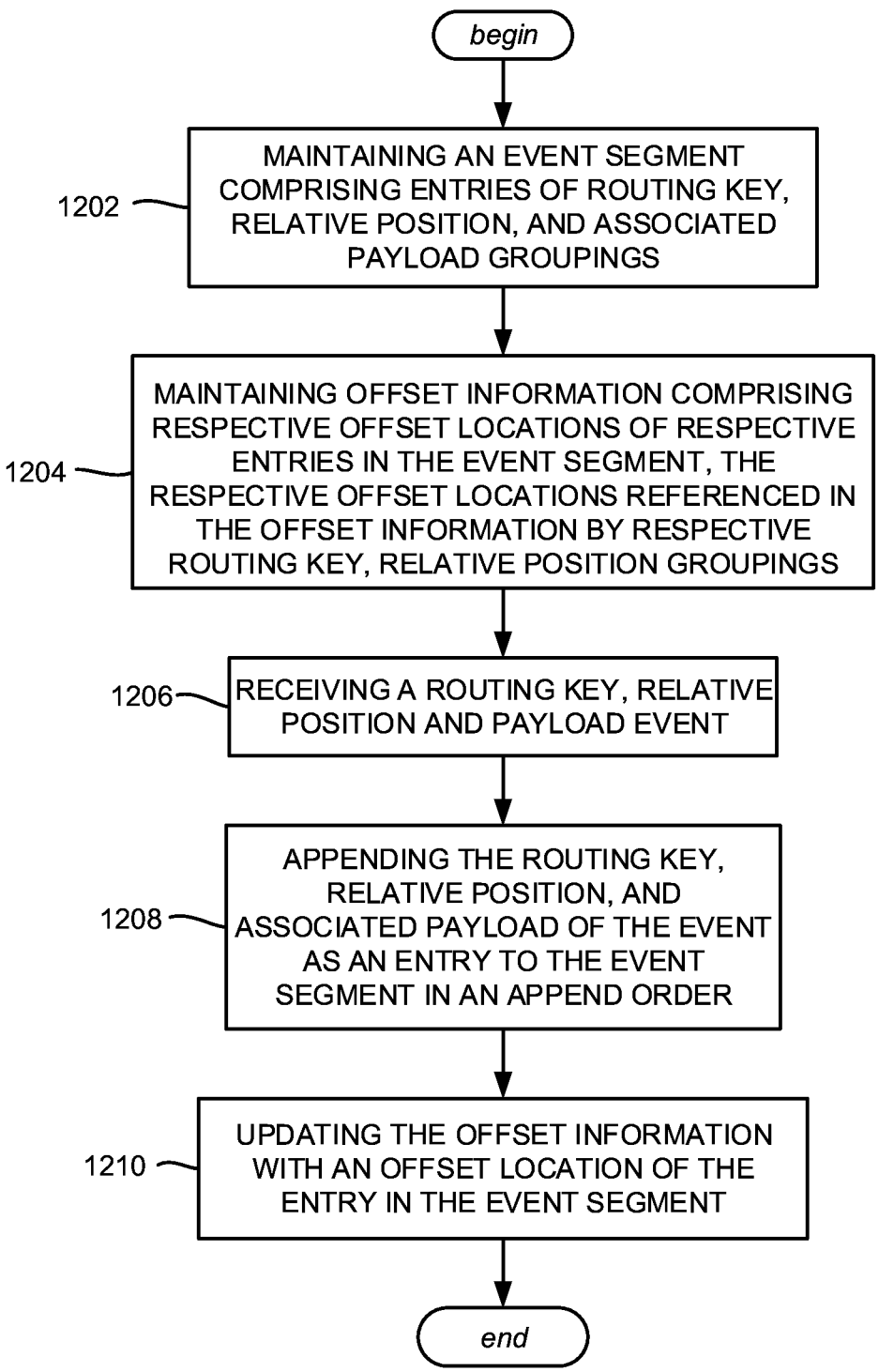
FIG. 12 is a flow diagram showing example operations related to appending an event to an event segment and updating offset information associated with the event based on position data, in accordance with various aspects and implementations of the subject disclosure.

One or more aspects can be embodied in a system, such as represented in FIG. 12, and for example can comprise a memory that stores computer executable components and/or operations, and a processor that executes computer executable components and/or operations stored in the memory. Example operations can comprise operation 1202, which represents maintaining an event segment comprising entries of routing key, relative position, and associated payload groupings. Example operation 1204 represents maintaining offset information comprising respective offset locations of respective entries in the event segment, the respective offset locations referenced in the offset information by respective routing key, relative position groupings. Example operation 1206 represents receiving a routing key, relative position and payload event. Example operation 1208 represents appending the routing key, relative position, and associated payload of the event as an entry to the event segment in an append order. Example operation 1210 represents updating the offset information with an offset location of the entry in the event segment.

Further operations can comprise receiving a read request corresponding to a range of relative positions for a specified routing key, and, in response to receiving the read request, accessing the offset information to locate respective offset locations of respective entries that match the specified routing key and are within the range of the positions, and accessing, via the respective offset locations, respective entries in the event segment.

Further operations can comprise outputting a view corresponding to the read request, which can comprise presenting respective payloads of the respective entries in an order that is based on the respective relative positions of the entries.

The read request can be an ongoing read request, and further operations can comprise updating the view upon receiving a new entry that matches the specified routing key and is within the range of the positions.

Maintaining the offset information can comprise maintaining an index segment and a tail index. The index segment can comprise a first key-value store, the tail index comprises a second can comprise, and the first key-value store and the second key-value store each can be sorted by routing keys and relative position per routing key, with each key of the index segment key-value store and the tail index key-value store comprising a routing key, relative position pairing with an associated value comprising an offset location in the event segment of an entry containing the routing key and the relative position for the pairing. The index segment can comprise a B+ tree data structure.

Aspects can comprise an indexing queue corresponding to the tail index, and further operations can comprise persisting offset data in the indexing queue to the offset index, and trimming offset information corresponding to the offset data from the tail index.

Further operations can comprise rebuilding the offset information based on the relative positions in the entries maintained within the event segment.

Figure 13:
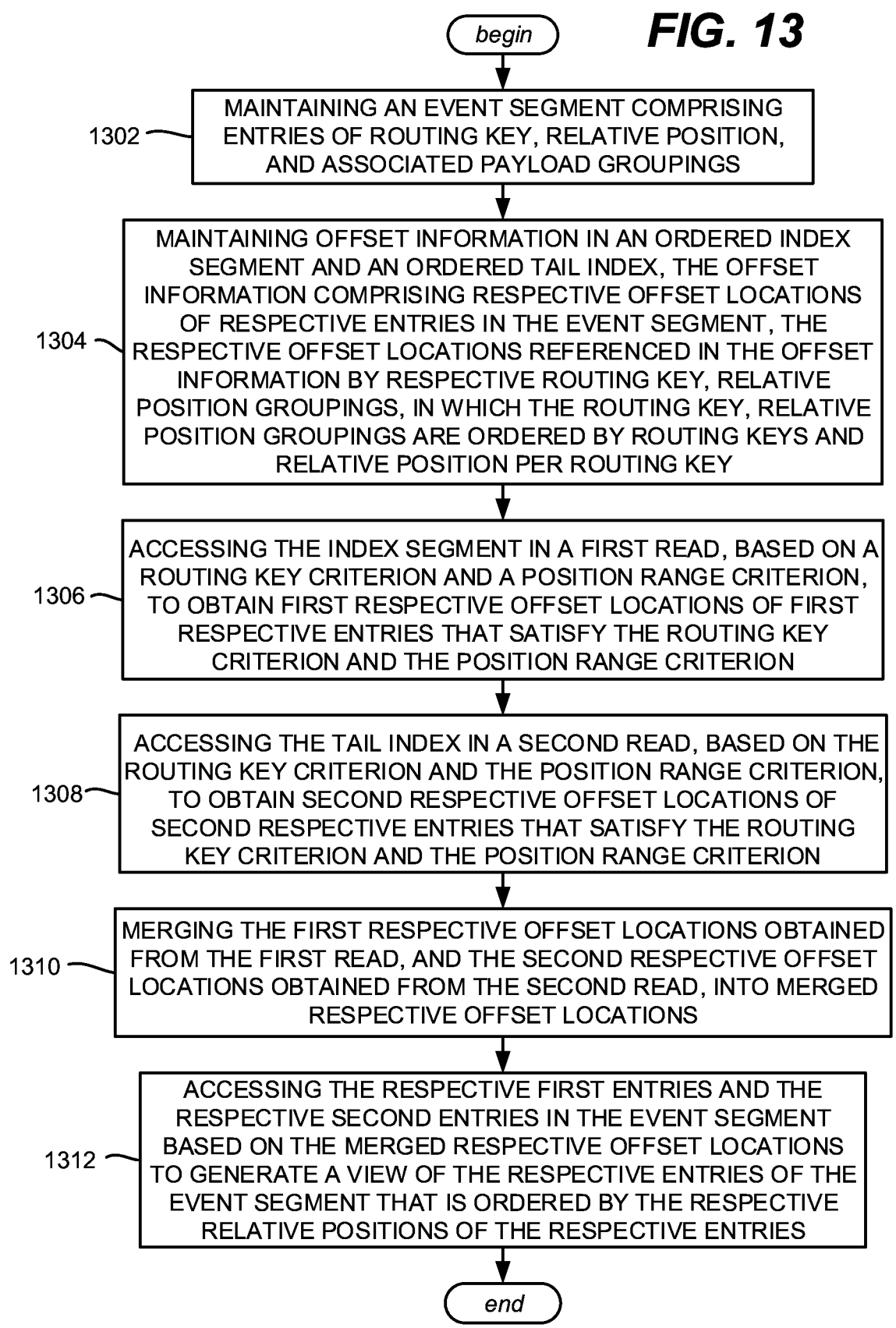
FIG. 13 is a flow diagram showing example operations related to maintaining an event segment and an index segment for reading the events according to their relative positions, in accordance with various aspects and implementations of the subject disclosure.

FIG. 13 summarizes various example operations, e.g., corresponding to a machine-readable storage medium, comprising executable instructions that, when executed by a processor of a streaming data storage system, facilitate performance of operations. Operation 1302 represents maintaining an event segment comprising entries of routing key, relative position, and associated payload groupings. Operation 1304 represents maintaining offset information in an ordered index segment and an ordered tail index, the offset information comprising respective offset locations of respective entries in the event segment, the respective offset locations referenced in the offset information by respective routing key, relative position groupings, in which the routing key, relative position groupings are ordered by routing keys and relative position per routing key. Operation 1306 represents accessing the index segment in a first read, based on a routing key criterion and a position range criterion, to obtain first respective offset locations of first respective entries that satisfy the routing key criterion and the position range criterion. Operation 1308 represents accessing the tail index in a second read, based on the routing key criterion and the position range criterion, to obtain second respective offset locations of second respective entries that satisfy the routing key criterion and the position range criterion. Operation 1310 represents merging the first respective offset locations obtained from the first read, and the second respective offset locations obtained from the second read, into merged respective offset locations. Operation 1312 represents accessing the respective first entries and the respective second entries in the event segment based on the merged respective offset locations to generate a view of the respective entries of the event segment that is ordered by the respective relative positions of the respective entries.

Further operations can comprise updating the view when a new entry is received that satisfies the routing key criterion and the position range criterion.

Further operations can comprise persisting batched data to the index segment, the batched data corresponding to respective offset locations referenced in the tail index by respective routing key, relative position groupings in the tail index, and trimming the tail index based on the batched data persisted to the index segment.

As can be seen, described herein is a technology that facilitates presenting a view of sorted events within an ordered segment based on a user-specified position data. The technology is practical to implement, works with existing streamed data segment technologies, and is extensible, e.g., to a distributed ordered stream (comprised of multiple such ordered segments).

When reading from an ordered stream, the user may choose to read in various ways. A classic read consumes events in the order in which they were received/in the same order they were appended. An ordered stream read can read the events between two user-provided positions in the stream, whether in append order or in position order.

One application for ordered streams is the concept of time series streams. Similar to a time series database, a time series stream is an ordered stream with time as the user-provided event position. By appending such events (with time) to an ordered stream, then that whole stream contains such events in their naturally occurring time order. This likely simplifies a potential upstream application that indexes by time (e.g., a general purpose time series database) or displays information using a time scale. Such applications need not be concerned with reordering out-of-order events because that as already done via the technology described herein. Further, such applications need not perform buffering to handle late-arriving events; they can issue queries against the ordered stream for data between two time stamps and read the events in their natural order.

If each event position is a timestamp (current time, elapsed time since a known point in time, or the like), an ordered segment can effectively sort the events by this time position and have the events be read in chronological order, irrespective of when they were written. Note that in many types of systems, requests are often delayed and often arrive out of order, whereby the technology described herein can provide benefits such situations.

The technology implements interleaved indices for different routing keys within a single segment. This can be viewed as having multiple "paths" within each segment, in which each path is an ordered sequence of events. The technology does not require a complex mechanism, such as those involving a "transaction log", indexer and multiple data and index files. An event segment acts as both a "log" and "data file(s)", and the index is generated dynamically to points to locations (offsets) within the event segment. This approach greatly reduces the complexity of maintaining the properties of an ordered segment, and can have a performance equivalent to that of a regular segment. This is advantageous as the technology can easily scale horizontally into thousands of such ordered segments.

Figure 14:
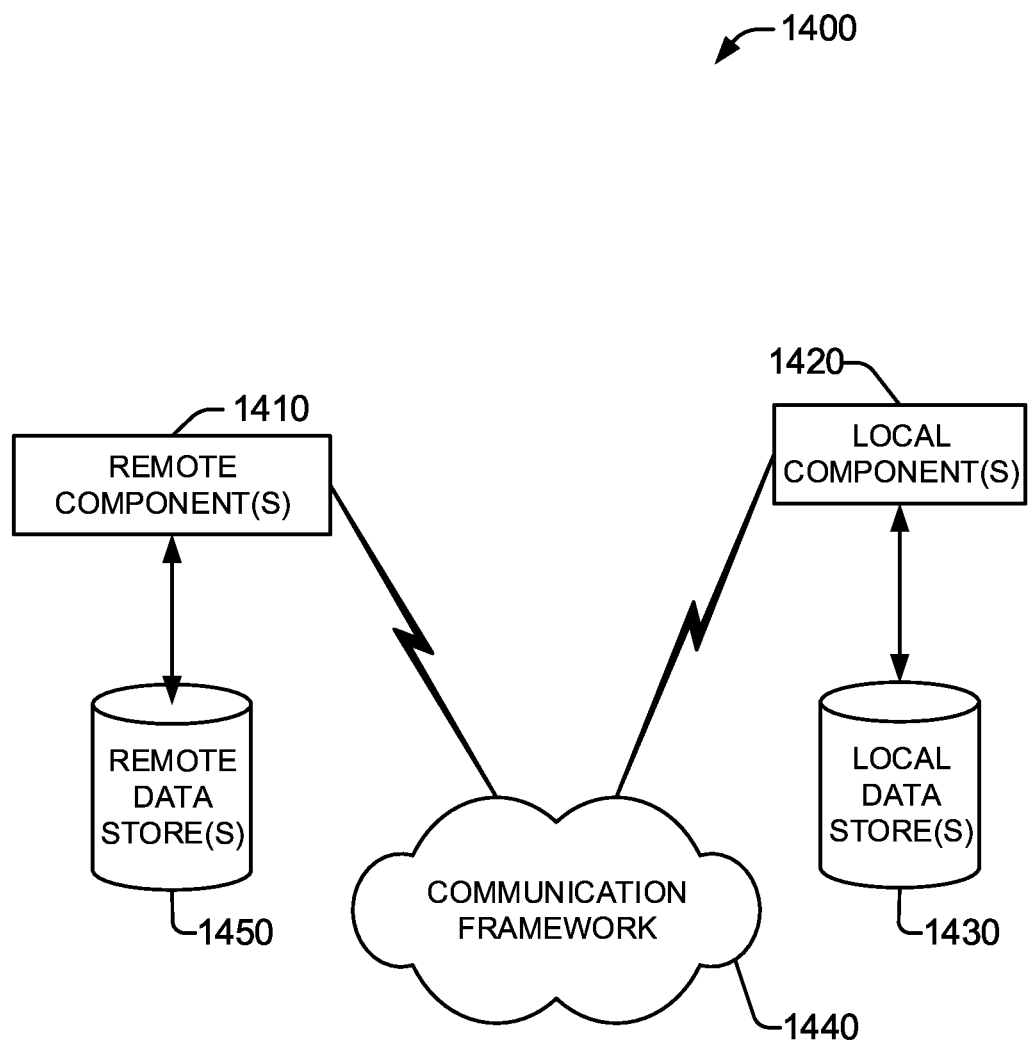
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
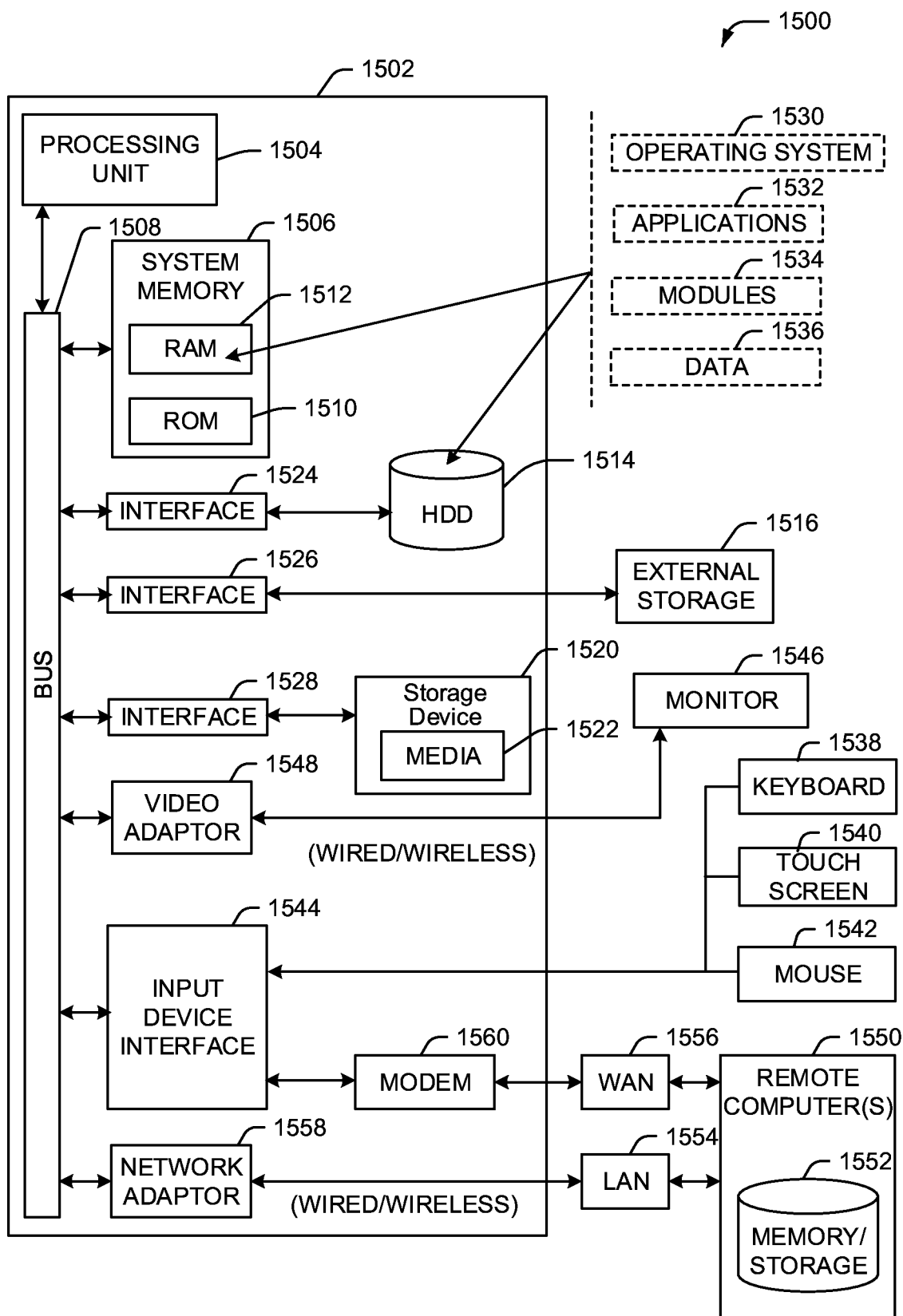
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method comprising,
   receiving, in a streaming data storage system comprising a processor, first event data comprising a routing key, a first relative position value and a first payload;
   appending a first entry comprising the routing key and the first payload of the first event data to an event store;
   maintaining first position information that associates the first relative position value with the first entry;
   receiving second event data comprising the routing key, a second relative position value and a second payload, wherein the second relative position value is less than the first relative position value;
   appending, to the event store after the first entry, a second entry comprising the routing key and the second payload of the second event data;
   maintaining second position information that associates the second relative position value with the second entry; and
   generating a position-ordered view of the event store, comprising accessing the first position information and the second position information to output the position-ordered view with the second payload of the second entry presented before the first payload of the first entry.

2. The method of claim 1, wherein the generating the position-ordered view of the event store comprises receiving a read request that specifies the routing key and a position range that comprises the first position value and the second position value.

3. The method of claim 1, wherein the generating the position-ordered view of the event store comprises receiving an ongoing read request that specifies the routing key and a position range that comprises the first position value and the second position value, and further comprising,
   receiving third event data comprising the routing key, a third relative position value and a third payload,
   appending, to the event store after the second entry, a third entry comprising the routing key and the third payload of the third event data,
   maintaining third position information that associates the third relative position value with the third entry, and
   updating the position-ordered view of the event store comprising outputting the third payload of the third entry in conjunction with the output of second payload of the second entry and the first payload of the first entry.

4. The method of claim 1, wherein the appending the first entry comprises including the first position data with the routing key and the first payload within the first entry, and wherein the appending the second entry comprises including the second position data with the routing key and the second payload within the second entry.

5. The method of claim 1, wherein the maintaining the first position information comprises maintaining an index data structure comprising a first offset location of the first entry in the event store, the first offset location indexed by the routing key and the first position value, and wherein the maintaining the second position information comprises maintaining the index data structure comprising a second offset location of the second entry in the event store, the second offset location indexed by the routing key and the second position value.

6. The method of claim 1, wherein the maintaining the first position information comprises maintaining a persistent index data structure comprising a first offset location of the first entry in the event store, the first offset location indexed by the routing key and the first position value, and wherein the maintaining the second position information comprises maintaining a tail index data structure comprising a second offset location of the second entry in the event store, the second offset location indexed by the routing key and the second position value.

7. The method of claim 6, wherein the generating the position-ordered view of the event store comprises receiving a read request that specifies the routing key and a position range that comprises the first position value and the second position value, and merging a first read of the persistent index data structure and a second read of the tail index data structure.

8. The method of claim 6, further comprising
   maintaining an indexing queue corresponding to the tail index,
   updating the persistent index data structure with data in the indexing queue, and trimming the tail index of data corresponding to the data persisted from the indexing queue.

9. A system, comprising:
a processor; and
a memory that stores executable instructions that, when executed by the processor, facilitate performance of operations, the operations comprising:
maintaining an event segment comprising entries of routing key, relative position, and associated payload groupings;
maintaining offset information comprising respective offset locations of respective entries in the event segment, the respective offset locations referenced in the offset information by respective routing key, relative position groupings;
receiving a routing key, relative position and payload event;
appending the routing key, relative position, and associated payload of the event as an entry to the event segment in an append order; and
updating the offset information with an offset location of the entry in the event segment.

10. The system of claim 9, wherein the operations further comprise receiving a read request corresponding to a range of relative positions for a specified routing key, and, in response to the receiving the read request, accessing the offset information to locate respective offset locations of respective entries that match the specified routing key and are within the range of the positions, and accessing, via the respective offset locations, respective entries in the event segment.

11. The system of claim 10, wherein the operations further comprise outputting a view corresponding to the read request, comprising presenting respective payloads of the respective entries in an order that is based on the respective relative positions of the entries.

12. The system of claim 11, wherein the read request is an ongoing read request, and wherein the operations further comprise updating the view upon receiving a new entry that matches the specified routing key and is within the range of the positions.

13. The system of claim 9, wherein the maintaining the offset information comprises maintaining an index segment and a tail index.

14. The system of claim 13, wherein the index segment comprises a first key-value store, wherein the tail index comprises a second key-value store, and wherein the first key-value store and the second key-value store are each sorted by routing keys and relative position per routing key, with each key of the index segment key-value store and the tail index key-value store comprising a routing key, relative position pairing with an associated value comprising an offset location in the event segment of an entry containing the routing key and the relative position for the pairing.

15. The system of claim 13, wherein the index segment comprises a B+ tree data structure.

16. The system of claim 13, further comprising an indexing queue corresponding to the tail index, and wherein the operations further comprise persisting offset data in the indexing queue to the offset index, and trimming offset information corresponding to the offset data from the tail index.

17. The system of claim 9, wherein the operations further comprise rebuilding the offset information based on the relative positions in the entries maintained within the event segment.

18. A non-transitory machine-readable medium, comprising executable instructions that, when executed by a processor of a streaming data storage system, facilitate performance of operations, the operations comprising:
maintaining an event segment comprising entries of routing key, relative position, and associated payload groupings;
maintaining offset information in an ordered index segment and an ordered tail index, the offset information comprising respective offset locations of respective entries in the event segment, the respective offset locations referenced in the offset information by respective routing key, relative position groupings, in which the routing key, relative position groupings are ordered by routing keys and relative position per routing key;
accessing the index segment in a first read, based on a routing key criterion and a position range criterion, to obtain first respective offset locations of first respective entries that satisfy the routing key criterion and the position range criterion;
accessing the tail index in a second read, based on the routing key criterion and the position range criterion, to obtain second respective offset locations of second respective entries that satisfy the routing key criterion and the position range criterion;
merging the first respective offset locations obtained from the first read, and the second respective offset locations obtained from the second read, into merged respective offset locations; and
accessing the respective first entries and the respective second entries in the event segment based on the merged respective offset locations to generate a view of the respective entries of the event segment that is ordered by the respective relative positions of the respective entries.

19. The non-transitory machine-readable medium of claim 18, wherein the operations further comprise updating the view when a new entry is received that satisfies the routing key criterion and the position range criterion.

20. The non-transitory machine-readable medium of claim 18, wherein the operations further comprise persisting batched data to the index segment, the batched data corresponding to respective offset locations referenced in the tail index by respective routing key, relative position groupings in the tail index, and trimming the tail index based on the batched data persisted to the index segment.

* * * * *